(12) United States Patent
Park et al.

(10) Patent No.: US 8,355,098 B2
(45) Date of Patent: Jan. 15, 2013

(54) WAVELENGTH CONVERSION MEMBER, LIGHT SOURCE ASSEMBLY INCLUDING THE WAVELENGTH CONVERSION MEMBER AND LIQUID CRYSTAL DISPLAY INCLUDING THE LIGHT SOURCE ASSEMBLY

(75) Inventors: Jae Byung Park, Sungnam-si (KR); Hae-Il Park, Seoul (KR); Jin-Seob Byun, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 612 days.

(21) Appl. No.: 12/355,950

(22) Filed: Jan. 19, 2009

(65) Prior Publication Data
US 2009/0195730 A1 Aug. 6, 2009

(30) Foreign Application Priority Data
Jan. 31, 2008 (KR) .................. 10-2008-0010186

(51) Int. Cl.
*G02F 1/1335* (2006.01)
*H01J 1/62* (2006.01)
(52) U.S. Cl. .................. 349/71; 313/487; 313/501
(58) Field of Classification Search .............. 349/71; 313/487, 501, 502
See application file for complete search history.

(56) References Cited

U.S. PATENT DOCUMENTS

| 4,626,694 | A * | 12/1986 | Sano et al. ............... 250/483.1 |
| 6,501,091 | B1 * | 12/2002 | Bawendi et al. ............... 257/14 |
| 7,319,289 | B2 * | 1/2008 | Suehiro et al. ............... 313/485 |
| 7,737,621 | B2 * | 6/2010 | Masuda et al. ............... 313/501 |
| 7,753,559 | B2 * | 7/2010 | Liu ............................... 362/293 |
| 7,812,516 | B2 * | 10/2010 | Maruyama et al. ............ 313/503 |
| 2006/0066210 | A1 * | 3/2006 | Ng et al. ........................ 313/486 |
| 2007/0052342 | A1 * | 3/2007 | Masuda et al. ............... 313/487 |
| 2008/0231162 | A1 * | 9/2008 | Kurihara et al. .............. 313/487 |
| 2008/0231170 | A1 * | 9/2008 | Masato et al. ................ 313/501 |
| 2009/0140630 | A1 * | 6/2009 | Kijima et al. ................. 313/498 |
| 2011/0019707 | A1 * | 1/2011 | Sato et al. ................... 372/45.01 |

FOREIGN PATENT DOCUMENTS

| CN | 1582410 A | 2/2005 |
| CN | 1874019 A | 12/2006 |
| WO | 03/038510 A1 | 5/2003 |

OTHER PUBLICATIONS

Chinese Office Action dated Aug. 31, 2012 in corresponding Chinese Appln. No. 200910003902.X.

* cited by examiner

*Primary Examiner* — Uyen Chau N Le
*Assistant Examiner* — Chris Chu
(74) *Attorney, Agent, or Firm* — F. Chau & Associates, LLC

(57) ABSTRACT

A wavelength conversion member which can achieve high color purity and optimize color temperature according to environmental changes, a light source assembly including the wavelength conversion member, and a liquid crystal display (LCD) including the light source assembly. The light source assembly includes a light-emitting chip which generates light and a wavelength conversion member which includes wavelength conversion particles that convert the light into light having a predetermined wavelength, the predetermined wavelength being determined according to the size of the wavelength conversion particles.

23 Claims, 11 Drawing Sheets

WAVELENGTH CONVERSION MEMBER, LIGHT SOURCE ASSEMBLY INCLUDING THE WAVELENGTH CONVERSION MEMBER AND LIQUID CRYSTAL DISPLAY INCLUDING THE LIGHT SOURCE ASSEMBLY

CROSS-REFERENCE TO RELATED APPLICATION

This application claims priority from Korean Patent Application No. 10-2008-0010186 filed on Jan. 31, 2008 in the Korean Intellectual Property Office, the disclosure of which is incorporated herein by reference in its entirety.

BACKGROUND OF THE INVENTION

1. Technical Field

The present invention relates to a wavelength conversion member, and more particularly, to a wavelength conversion member which can achieve high color purity and optimize color temperature according to environmental changes, a light source assembly including the wavelength conversion member and an LCD including the light source assembly.

2. Discussion of the Related Art

In recent years, the demand for flat panel display devices, such as plasma display panel (PDP) devices, plasma-addressed liquid crystal (PALC) display panel devices, liquid crystal display (LCD) devices and organic light-emitting diode (OLED) devices, has increased dramatically since conventional cathode ray tube (CRT) devices cannot to meet the ever-increasing demand for thin and large-scale display devices.

As one of the most widely used flat panel display devices, LCDs generally include two display panels with field-generating electrodes such as pixel and common electrodes mounted thereon, and a liquid crystal layer interposed between the two display panels. An LCD determines the alignment of liquid crystal molecules in a liquid crystal layer, and thus adjusts the transmittance of the liquid crystal layer, thereby displaying an image.

Generally, most LCDs are passive light-emitting devices and thus require a backlight assembly which provides light. Various light sources such as a cold cathode fluorescent lamp (CCFL), an external electrode fluorescent lamp (EEFL) or a light-emitting diode (LED) may be used in a backlight assembly. However, to meet the recent demand for a light source capable of providing high definition and high luminance, it is necessary to develop a light source assembly capable of maintaining high definition and high luminance even after a long use and adjusting the color temperature of light according to the properties of the environment in which the light source assembly is used.

SUMMARY OF THE INVENTION

Embodiments of the present invention provide a wavelength conversion member, a light source assembly including the wavelength conversion member, and a liquid crystal display (LCD) including the light source assembly, all of which can realize high color purity and optimize color temperature according to environmental changes.

According to an embodiment of the present invention, a light source assembly includes a light-emitting chip which generates light, and a wavelength conversion member which includes wavelength conversion particles that convert the light into light having a predetermined wavelength, the predetermined wavelength being determined according to the size of the wavelength conversion particles.

According to another embodiment of the present invention, a light source assembly includes a light source unit which includes a light-emitting chip that generates light and a wavelength conversion layer that is disposed on the light-emitting chip and that changes the color of the light generated by the light-emitting chip, and a wavelength conversion member which includes a plurality of wavelength conversion patterns that convert light generated by the light source unit into light having a predetermined wavelength, wherein the light source assembly adjusts the color of light by adjusting the overlapping areas of the wavelength conversion layer and the wavelength conversion patterns.

According to another embodiment of the present invention, an LCD includes a liquid crystal panel which displays images, and a light source assembly which includes a light-emitting chip that generates light and a plurality of wavelength conversion members, each of the wavelength conversion members including a plurality of wavelength patterns, the wavelength patterns converting the light generated by the light-emitting chip into light having a predetermined wavelength, wherein the wavelength conversion members are aligned to overlap each other and the light source assembly adjusts the color of light by adjusting the overlapping areas of the wavelength conversion patterns of each of the wavelength conversion members.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF EXEMPLARY EMBODIMENTS

The present invention will now be described more fully with reference to the accompanying drawings, in which exemplary embodiments of the invention are shown. The invention may, however, be embodied in many different forms and should not be construed as being limited to the embodiments set forth herein. It will be understood that when an element is referred to as being "connected" or "coupled" to another element, it can be directly connected or coupled to the other element or intervening elements may be present. Like numbers may refer to like elements throughout.

Figure 1:
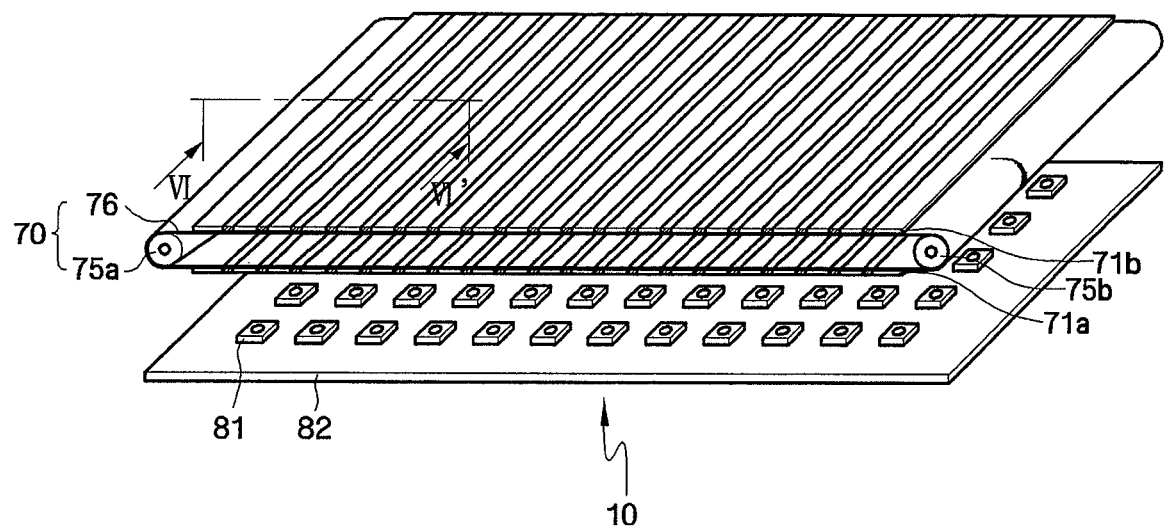
FIG. 1 illustrates a perspective view of a light source assembly according to an embodiment of the present invention.
Figure 2:
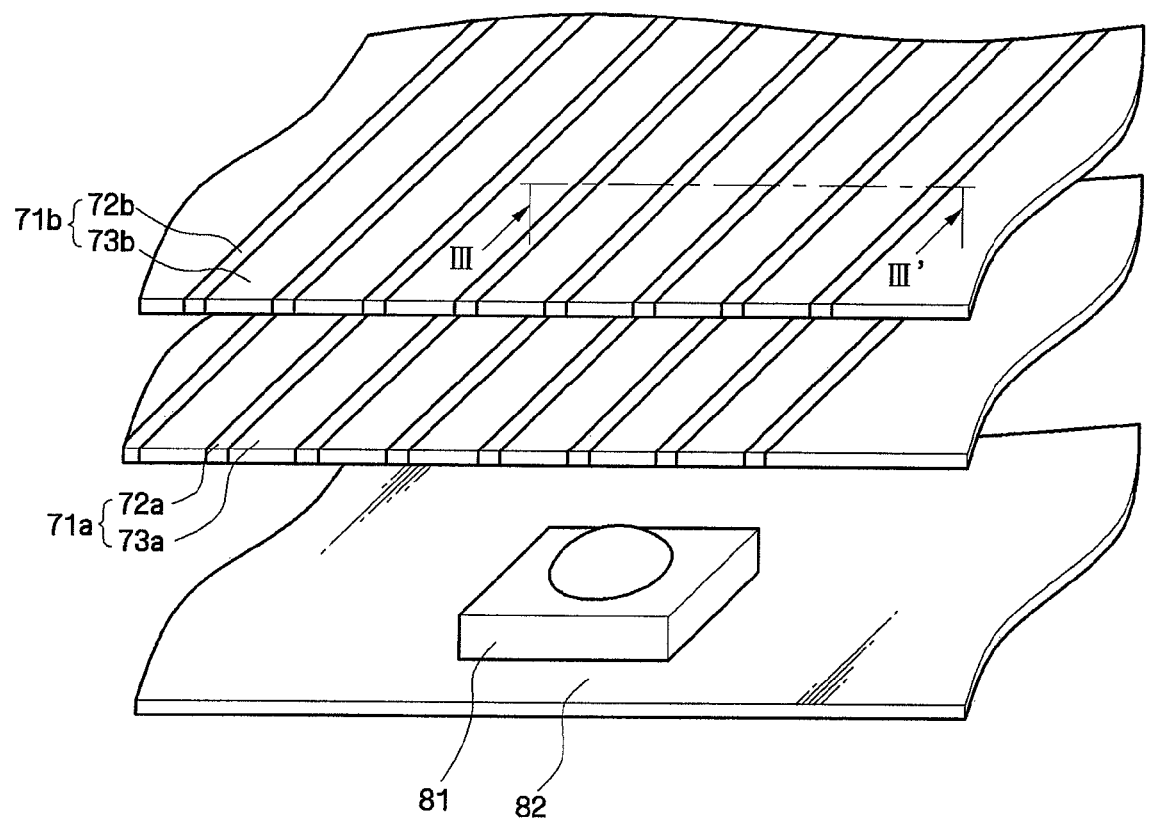
FIG. 2 illustrates an enlarged perspective view of part of the light source assembly shown in FIG. 1.
Figure 3:
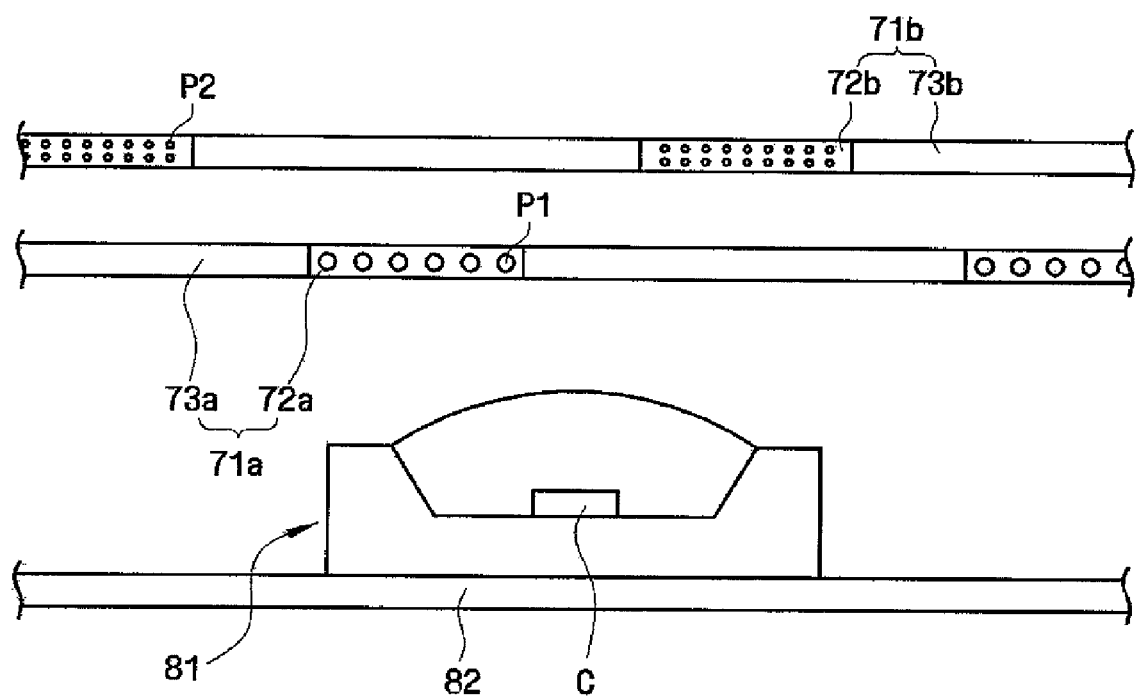
FIG. 3 illustrates a cross-sectional view taken along line III-III' of FIG. 2.

FIG. 1 illustrates a perspective view of a light source assembly 10 according to an embodiment of the present invention, FIG. 2 illustrates an enlarged perspective view of the light source assembly 10, and FIG. 3 illustrates a cross-sectional view taken along line III-III' of FIG. 2.

Figure 14:
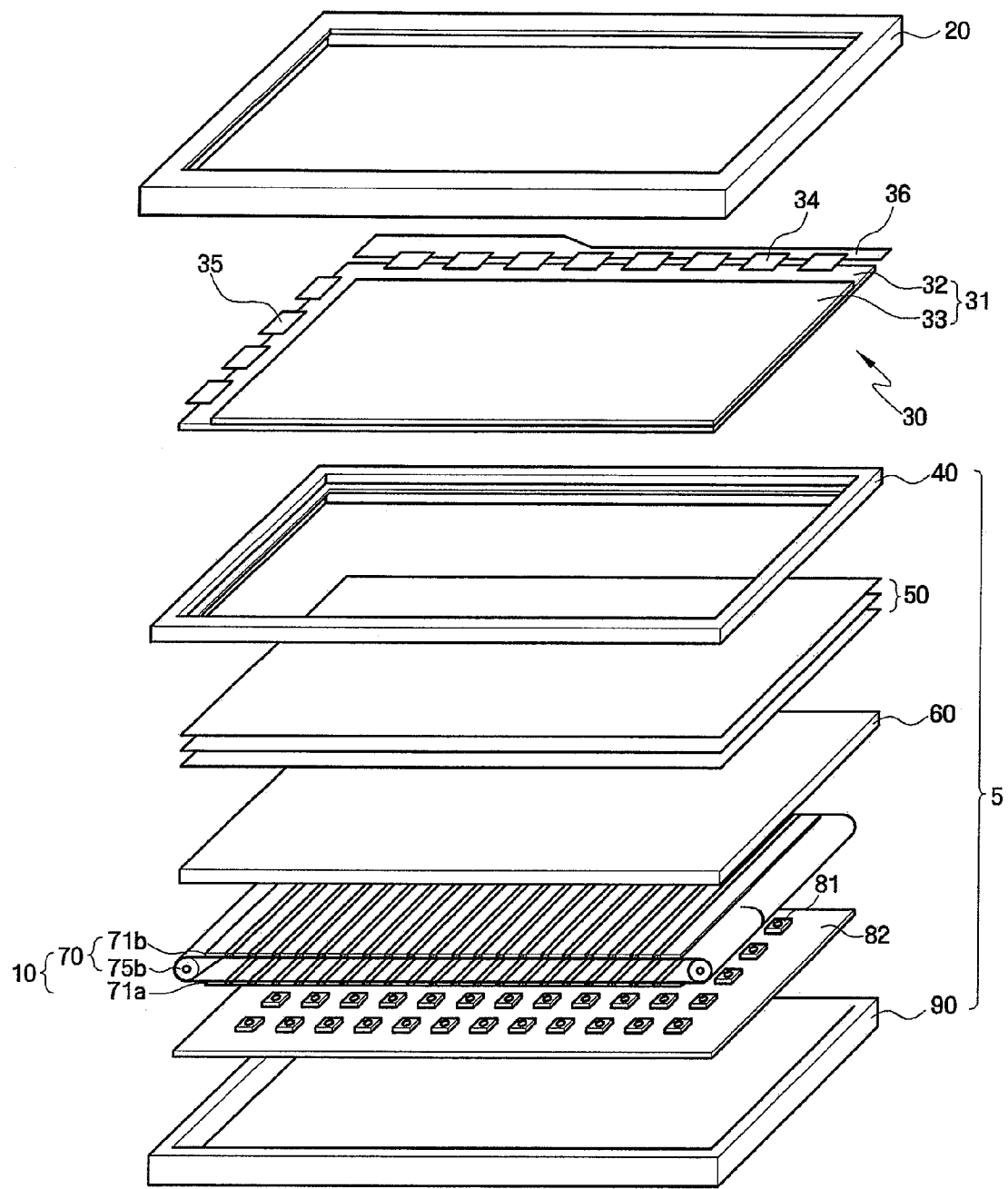
FIG. 14 illustrates an exploded perspective view of a liquid crystal display (LCD) according to an embodiment of the present invention.

Referring to FIGS. 1 and 14, the light source assembly 10, which provides light to a liquid crystal panel 31 of a liquid crystal display 1 (LCD), includes a plurality of light source units 81, a circuit board 82, a first wavelength conversion sheet 71a, a second wavelength conversion sheet 71b and a sheet moving unit 70.

The light source assembly 10 provides the liquid crystal panel 31 with white light, which is obtained by sequentially passing light generated by the light source units 81 through the first wavelength conversion sheet 71a and the second wavelength conversion sheet 71b. More specifically, each of the light source units 81 includes a light-emitting chip C (see, e.g., FIG. 3) therein and generates light. The light source units 81 are mounted on the circuit board 82 and are provided with a driving voltage for generating light. The light source units 81 may be point light source units. The light source units 81 may be evenly spaced from one another and may thus be able to provide uniform light to the liquid crystal panel 31.

The light-emitting chips C of the light source units 81 may generate light having a single wavelength and thus having high color purity. Light emitted from the light-emitting chips C of the light source units 81 may be blue light or light having a wavelength shorter than that of blue light. Two wavelength conversion sheets may be disposed above the light source units 81. In order to provide white light to the liquid crystal panel 31 through the two wavelength conversion sheets, the light source units 81 may use light-emitting chips that generate blue light. The light-emitting chips C of the light source units 81 may be light-emitting diodes (LEDs), laser light sources, or cold cathode fluorescent lamps (CCFLs).

The light-emitting chips C of the light source units 81 may use light having a single wavelength and thus having high color purity, but embodiments of the present invention are not restricted to this. That is, the light-emitting chips C of the light source units 81 may use visible light or light having a wavelength shorter than that of ultraviolet (UV) light.

In addition, the embodiments of the present invention are not restricted to the first and second wavelength conversion sheets 71a and 71b. That is, the light source assembly 10 may include various types of wavelength conversion members such as wavelength conversion plates. Members that have wavelength conversion particles and are thus capable of converting the wavelength of incident light are referred to as wavelength conversion members.

Referring to FIGS. 2 and 3, the first wavelength conversion sheet 71a is disposed above the light source units 81. The first wavelength conversion sheet 71a converts the wavelength of light generated by the light source units 81, thereby changing the color of the light. The first wavelength conversion sheet 71a includes a plurality of first wavelength conversion patterns 72a, which alter the wavelength of light, and a plurality of first light-transmission patterns 73a, which transmit light therethrough without converting the wavelength of the light. The first wavelength conversion sheet 71a may be formed as a transparent sheet or plate.

Each of the first wavelength conversion patterns 72a includes first wavelength conversion particles $P_1$, which convert the wavelength of light emitted from a light-emitting chip C. Light emitted from the light-emitting chip C collides with the first wavelength conversion particles $P_1$ in the first wavelength conversion patterns 72a, and thus causes energy conversion so that the wavelength and the color of the light can change. That is, the color of light emitted from the light-emitting chip C changes into a color corresponding to a predetermined wavelength as soon as the light transmits through the first wavelength conversion patterns 72a.

The first wavelength conversion sheet 71a may be formed as a transparent sheet or plate that can transmit light therethrough, and include the first wavelength conversion particles $P_1$, which convert the wavelength of light.

The first wavelength conversion particles $P_1$ or second wavelength conversion particles $P_2$ convert the wavelength of light incident thereupon to enable emission of light having a desired wavelength. The wavelength of light emitted from the first or second wavelength conversion sheet 71a or 71b is determined according to the size of the first or second wavelength conversion particles $P_1$ or $P_2$. Accordingly, it is possible to emit light having a desired wavelength by appropriately adjusting the size of the first or second wavelength conversion particles $P_1$ or $P_2$. The first or second wavelength conversion particles $P_1$ or $P_2$ may be formed of, for example, CdSe/ZnS. The diameter of the first or second wavelength conversion particles $P_1$ or $P_2$ may be adjusted within a range of about 1 nm-about 10 nm. As the size of the first or second wavelength conversion particles $P_1$ or $P_2$ decreases, the wavelength of light emitted from the first or second wavelength conversion particles $P_1$ or $P_2$ becomes shorter, and thus, blue or bluish light may eventually be emitted from the first or second wavelength conversion particles $P_1$ or $P_2$. On the other hand, as the size of the first or second wavelength conversion particles $P_1$ or $P_2$ increases, the wavelength of light emitted from the first or second wavelength conversion particles $P_1$ or $P_2$ becomes longer, and thus, red or reddish light may eventually be emitted from the first or second wavelength conversion particles $P_1$ or $P_2$.

Each of the first or second wavelength conversion particles $P_1$ or $P_2$ includes an inner core and an outer shell that surrounds the inner core. More specifically, if the first or second wavelength conversion particles $P_1$ or $P_2$ are formed of CdSe/ZnS, the inner cores of the first or second wavelength conversion particles $P_1$ or $P_2$ may be formed of CdSe, and the outer shells of the first or second wavelength conversion particles $P_1$ or $P_2$ may be formed of ZnS.

The first light-transmission patterns 73a are portions of the first wavelength conversion sheet 71a where the first wavelength conversion patterns 72a are not formed. The first light-transmission patterns 73a transmit light therethrough without converting the wavelength of the light.

For example, the first wavelength conversion sheet 71a may be provided with blue light by the light source units 81 and emit the blue light as blue light. On the other hand, the first wavelength conversion patterns 72a may be provided with blue light by the light source units 81, convert the blue light into red light and emit the red light. That is, the first wavelength conversion particles $P_1$ convert light incident thereupon into red light.

The second wavelength conversion sheet 71b is disposed above the first wavelength conversion sheet 71a. The second wavelength conversion sheet 71b converts the wavelength of light transmitted through the first wavelength conversion sheet 71a. The second wavelength conversion sheet 71b includes a plurality of second wavelength conversion patterns 72b and a plurality of second light-transmission patterns 73b. The second wavelength conversion sheet 71b may be formed as a transparent sheet or plate that can transmit light therethrough.

Each of the second wavelength conversion patterns 72b includes the second wavelength conversion particles $P_2$, which convert the wavelength of light incident thereupon. The second wavelength conversion particles $P_2$ emit green light by converting the wavelength of light incident thereupon. The diameter of the second wavelength conversion particles $P_2$ may be less than the diameter of the first wavelength conversion particles $P_1$.

The second light-transmission patterns 73b are portions of the second wavelength conversion sheet 71b where the second wavelength conversion patterns 72b are not formed. The second light-transmission patterns 73b may transmit light therethrough without converting the wavelength of the light.

The first and second wavelength conversion sheets 71a and 71b may overlap each other. The color temperature of light to be emitted from the light source assembly 10 may be appropriately adjusted by adjusting the overlapping areas of the first wavelength conversion patterns 72a and the second wavelength conversion patterns 72b.

The conversion of the wavelength of light generated by the light source units 81, as performed by the first and second wavelength conversion sheets 71a and 71b will hereinafter be described in further detail. Assuming that blue light is generated by the light source units 81, the blue light may be emitted as blue light after transmitting through the first and second light-transmission patterns 73a and 73b. The blue light may be emitted as red light after transmitting through the first wavelength conversion patterns 72a and the second light-transmission patterns 73b. The blue light may be emitted as green light after transmitting through the first light-transmission patterns 73a and the second wavelength conversion patterns 72b. The blue light may also be emitted as red light after transmitting through the first wavelength conversion patterns 72a and the second wavelength conversion patterns because the second wavelength conversion particles $P_2$ convert light incident thereupon into light having a wavelength shorter than that of green light.

In short, the first wavelength conversion patterns 72a convert light incident thereupon into red light, and the second wavelength conversion patterns 72b convert light incident thereupon into green light. However, the embodiments of the present invention are not restricted to the arrangement of the first wavelength conversion patterns 72a and the second wavelength conversion patterns 72b as set forth herein.

The first wavelength conversion patterns 72a may be formed in the first wavelength conversion sheet 71a as stripes and may extend in parallel with one another. Likewise, the second wavelength conversion patterns 72b may be formed in the second wavelength conversion sheet 71b as stripes and may extend in parallel with one another. The width of the first or second wavelength conversion patterns 72a or 72b and the width of the first or second light-transmission patterns 73a or 73b may be appropriately adjusted, if necessary. In order to increase or reduce the overlapping areas of the first wavelength conversion patterns 72a and the second wavelength conversion patterns 72b, the first or second wavelength conversion sheet 71a or 71b may be moved in a direction perpendicular to the direction in which the first wavelength conversion patterns 72a and the second wavelength conversion patterns 72b extend. The first or second wavelength conversion sheets 71a or 71b may be moved by the sheet moving unit 70, which will be described later in detail.

Figure 4:
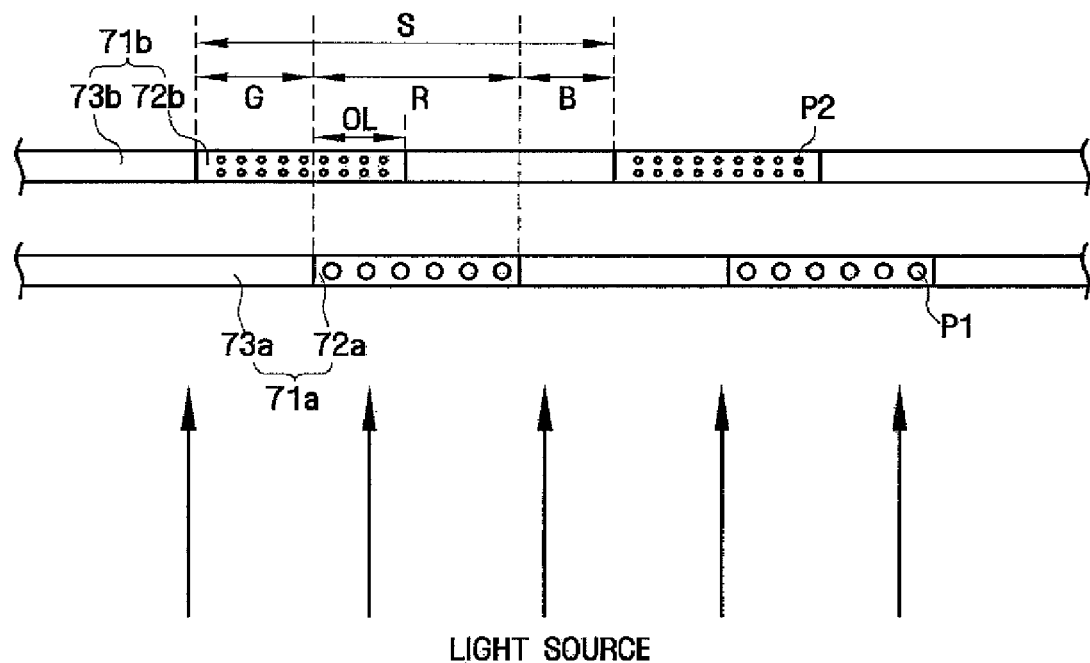
FIGS. 4 and 5 illustrate cross-sectional views for explaining the operation of the light source assembly shown in FIG. 1.
Figure 5:
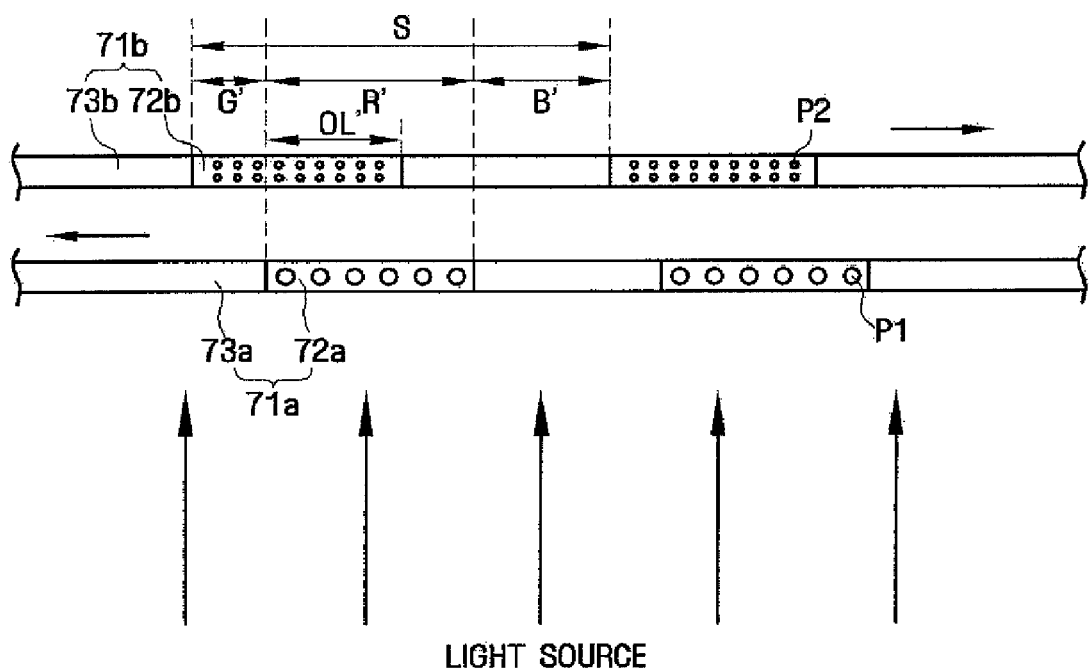

The adjustment of light emitted from the light source assembly 10 will hereinafter be described in detail with reference to FIGS. 4 and 5. FIGS. 4 and 5 illustrate cross-sectional views for explaining the operation of the light source assembly 10.

Referring to FIG. 4, when light is incident from a light source, which is disposed below the first and second wavelength conversion sheets 71a and 71b, the incident light sequentially transmits through the first wavelength conversion sheet 71a and the second wavelength conversion sheet 71b. Assume that the incident light and light emitted from the first and second wavelength conversion sheets 71a and 71b are both parallel light.

The second wavelength conversion sheet 71b is divided into a plurality of unit areas S, each unit area including a second wavelength conversion pattern 72b and a second light-transmission pattern 73b. Assume that blue light is incident from the light source, each of the unit areas S may be divided into a red area R from which red light is emitted, a green area G from which green light is emitted, and a blue area B from which blue light is emitted.

The blue area B corresponds to the situation when the incident light sequentially transmits through a first light-transmission pattern 73a and a second light-transmission conversion pattern 73b. The blue area B is an area from which the incident light is emitted as it is without any color change.

The green area G corresponds to the situation when the incident light sequentially transmits through a first light-transmission pattern 73a, which transmits the incident light therethrough without changing the color of the incident light, and a second wavelength conversion pattern 72b, which converts the light transmitted through the first light-transmission pattern 73a into green light. The green area G accounts for all the second wavelength conversion patterns 72b except for the overlapping areas OL of the first wavelength conversion patterns 72a and the second wavelength conversion patterns 72b.

The red area R corresponds to the situation when the incident light transmits through a first wavelength conversion pattern 72a, which converts the incident light into red light. Once the incident light is converted into red light after transmitting through the first wavelength conversion patterns 72a, the color of the red light does not change even after the red light transmits through the second wavelength conversion patterns 72b or the second light-transmission patterns 73b, because the first or second wavelength conversion particles $P_1$ or $P_2$ form a predetermined band gap and thus transmit light having a predetermined wavelength or longer therethrough without converting the wavelength of the light.

The ratio of red light, green light and blue light in light emitted from the second wavelength conversion sheet 71b is determined according to the ratio of the red, green and blue areas R, G and B in each of the unit areas S, and affects the color temperature of light emitted from the light source assembly 10.

Referring to FIG. 5, the first and second wavelength conversion sheets 71a and 71b may be moved in opposite directions, thereby adjusting the overlapping areas between the first wavelength conversion patterns 72a and the second wavelength conversion patterns 72b.

When the first and second wavelength conversion sheets 71a and 71b are moved in opposite directions, the ratio of the red, green and blue areas R, G and B in each of the unit areas S varies. More specifically, referring to FIG. 5, as the first and second wavelength conversion sheets 71a and 71b are moved in opposite directions, the overlapping areas between the first wavelength conversion patterns 72a and the second wavelength conversion patterns 72b increase, and thus, the proportion of the green area G in each of the unit areas S decreases to G' and the proportion of the blue area B in each of the unit areas S increases to B', whereas the proportion of the red area R in each of the unit areas S does not change but is maintained at R'. The ratio of the red, green and blue areas R, G and B in each of the unit areas S may be altered in various manners according to the direction in which and the distance by which the first and second wavelength conversion sheets 71a and 71b are moved. Therefore, it is possible to adjust the color temperature of light emitted from the light source assembly 10.

The sheet moving unit 70 of the light source assembly 10 will hereinafter be described in detail with reference to FIGS. 1 and 6.

Figure 6:
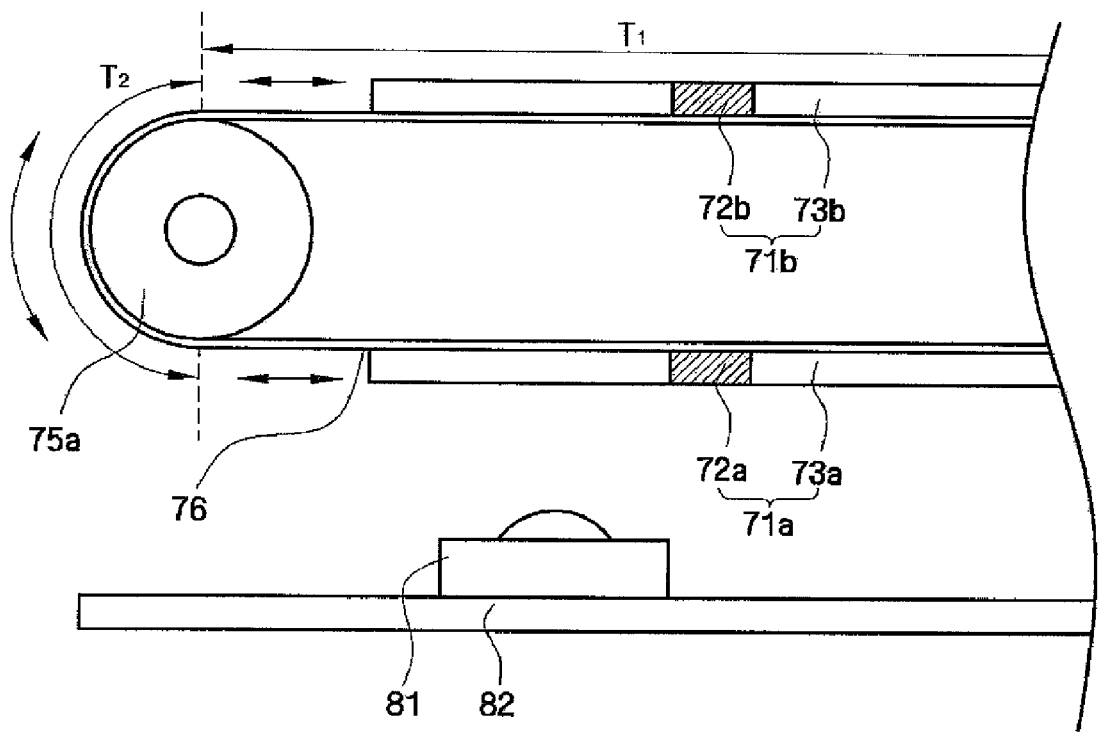
FIG. 6 illustrates a cross-sectional view taken along line VI-VI' of FIG. 1.

FIG. 6 illustrates a cross-sectional view taken along line VI-VI' of FIG. 1. Referring to FIG. 6, the sheet moving unit 70 moves the first and second wavelength conversion sheets 71a and 71b laterally. The sheet moving unit 70 includes moving rollers 75a and 75b and a moving belt 76.

The sheet moving unit 70 moves the first and second wavelength conversion sheets 71a and 71b by the same amount in opposite directions, thereby adjusting the overlapping areas between the first wavelength conversion patterns 72a and the second wavelength conversion patterns 72b.

The moving rollers 75a and 75b are disposed on both ends of the sheet moving unit 70, and are connected by the moving belt 76. More specifically, the moving rollers 75a and 75b are disposed on both ends of the first and second wavelength conversion sheets 71a and 71b, and the moving belt 76 is wound on the moving rollers 75a and 75b. As the moving rollers 75a and 75b rotate, the moving belt 76 moves accordingly because the moving belt 76 is wound on the moving rollers 75a and 75b. The moving belt 76 is divided into rectilinear motion sections T1 and rotation sections T2. The rectilinear motion sections T1 move laterally, and the rotation sections T2 rotate.

The first and second wavelength conversion sheets 71a and 71b are attached on the rectilinear motion sections T1. Since the moving belt 76 is formed of a flexible material, the moving belt 76 can be moved by the moving rollers 75a and 75b even when the moving rollers 75a and 76b have a small diameter, and the first and second wavelength conversion sheets 71a and 71b, which are sheets or plates having predetermined rigidity, can be effectively attached on the rectilinear motion sections T1. The moving rollers 75a and 75b may be precisely controlled by a controller (not shown).

The sheet moving unit 70 may be used for a light source assembly of a direct-type LCD in which light sources are disposed directly below a liquid crystal panel. However, the embodiments of the present invention are not restricted to this. That is, the sheet moving unit 70 may also be used for a light source assembly of an edge-type LCD in which light sources are disposed on one side of a waveguide plate.

The sheet moving unit 70 is exemplary, and thus, the embodiments of the present invention are not restricted thereto. That is, various devices, other than the sheet moving unit 70, may be used in the light source assembly 10 as long as they can move the first and second wavelength conversion sheets 71a and 71b and can thus adjust the overlapping areas between the first wavelength conversion patterns 72a and the second wavelength conversion patterns 72b.

Figure 7A:
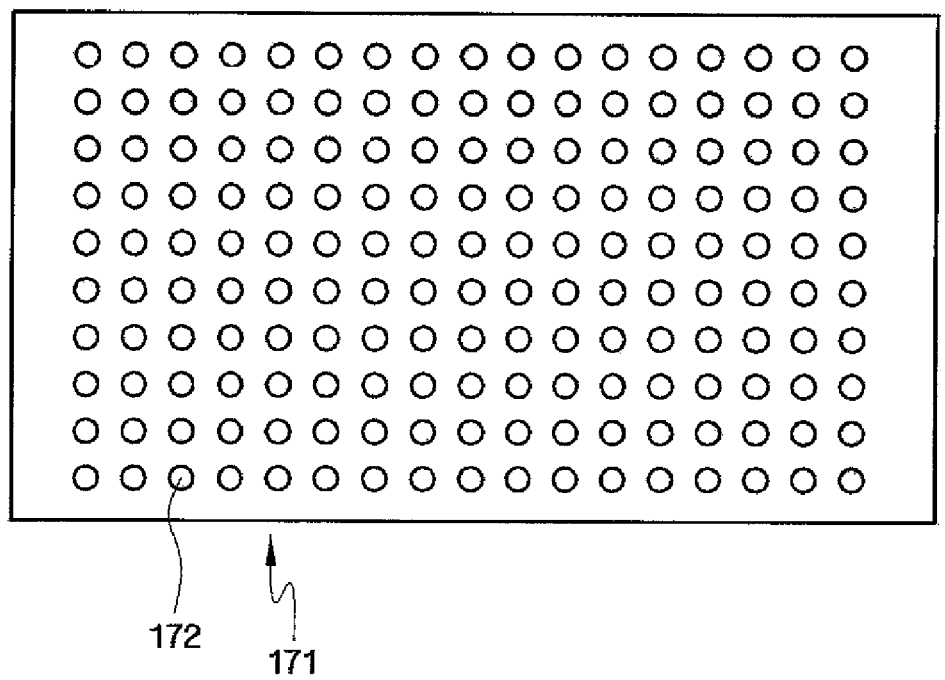
FIGS. 7A through 7C illustrate plan views of various embodiments of a first or second wavelength conversion sheet shown in FIG. 1.
Figure 7B:
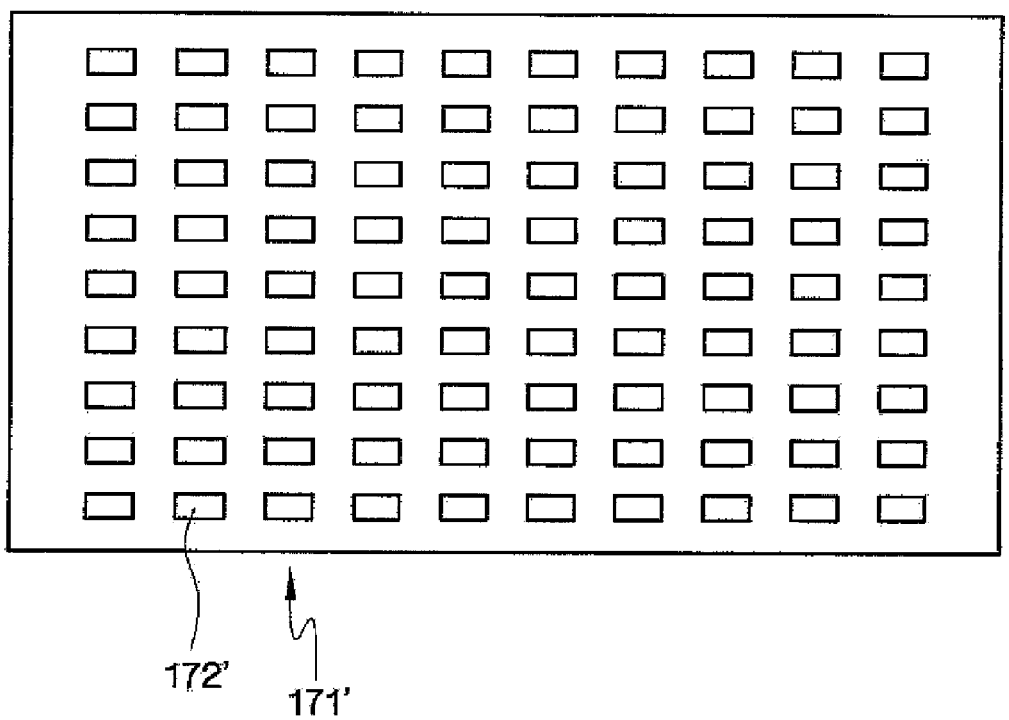
Figure 7C:
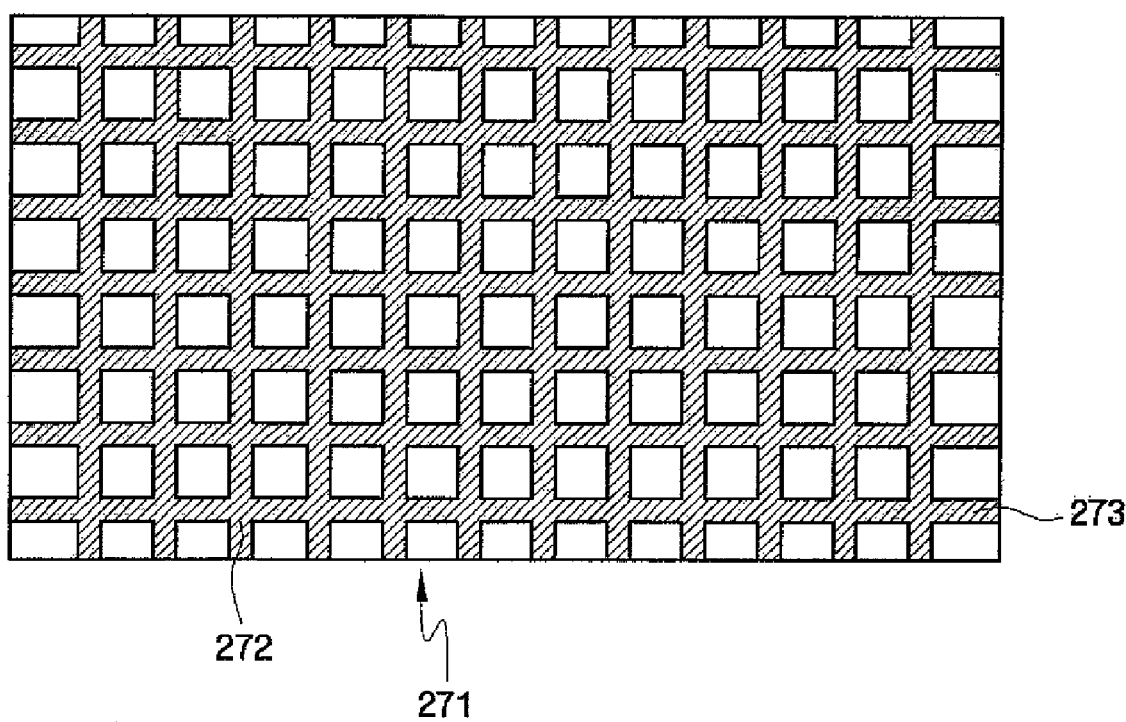

Various embodiments of the first or second wavelength conversion sheet 71a or 71b will hereinafter be described in detail. FIGS. 7A through 7C illustrate plan views of various embodiments of the first or second wavelength conversion sheet 71a or 71b.

Referring to FIGS. 7A and 7B, a wavelength conversion sheet 171 includes a plurality of wavelength conversion patterns 172, which are circular dots, and a wavelength conversion sheet 171' includes a plurality of wavelength conversion patterns 172', which are rectangular dots. Since the wavelength conversion sheets 171 and 171' include dot-type wavelength conversion patterns, adjustment of the size and the density of the wavelength conversion patterns 172 and 172' is facilitated. That is, when the wavelength conversion patterns 172 and 172' are included in a large-scale light source assembly, various correction values may be necessary. Since the wavelength conversion sheets 171 and 171' include dot-type wavelength conversion patterns, it is possible to easily adjust such correction values.

The wavelength conversion sheets 171 and 171' may include various types of dot-type wavelength conversion patterns, other than circular dot- and regular dot-type wavelength conversion patterns. For example, the wavelength conversion sheets 171 and 171' may include oval dot- or triangular dot-type wavelength conversion patterns. The size and the density of the wavelength conversion patterns 172 or 172' may be altered in various manners, and the wavelength conversion patterns 172 or 172' may be arranged in various manners.

Referring to FIG. 7C, a wavelength conversion sheet 271 includes lattice type wavelength conversion patterns 272.

If two wavelength conversion sheets 271 are aligned to overlap each other and then are moved in a horizontal direction, the overlapping areas of the vertical (columnar) wavelength conversion patterns of the two wavelength conversion sheets 271 vary accordingly, whereas the overlapping areas of the horizontal (row) wavelength conversion patterns of the two wavelength conversion sheets 271 do not change at all. As a result, light having a uniform color temperature is emitted from the overlapping areas of the horizontal wavelength conversion patterns of the two wavelength conversion sheets 271, whereas light having a variable color temperature is emitted from the overlapping areas of the vertical wavelength conversion patterns of the two wavelength conversion sheets 271. In this manner, it is possible to reduce the area from which light having a variable color temperature is emitted. In addition, it is possible to reduce the probability of defects or errors even after a long use of a light source assembly.

Referring to FIG. 7C, the width of the vertical wavelength conversion patterns 272 may be different from the width of the horizontal wavelength conversion patterns 273. The distance between a pair of adjacent vertical wavelength conversion patterns 272 may be different from the distance between a pair of adjacent horizontal wavelength conversion patterns 273.

Figure 8:
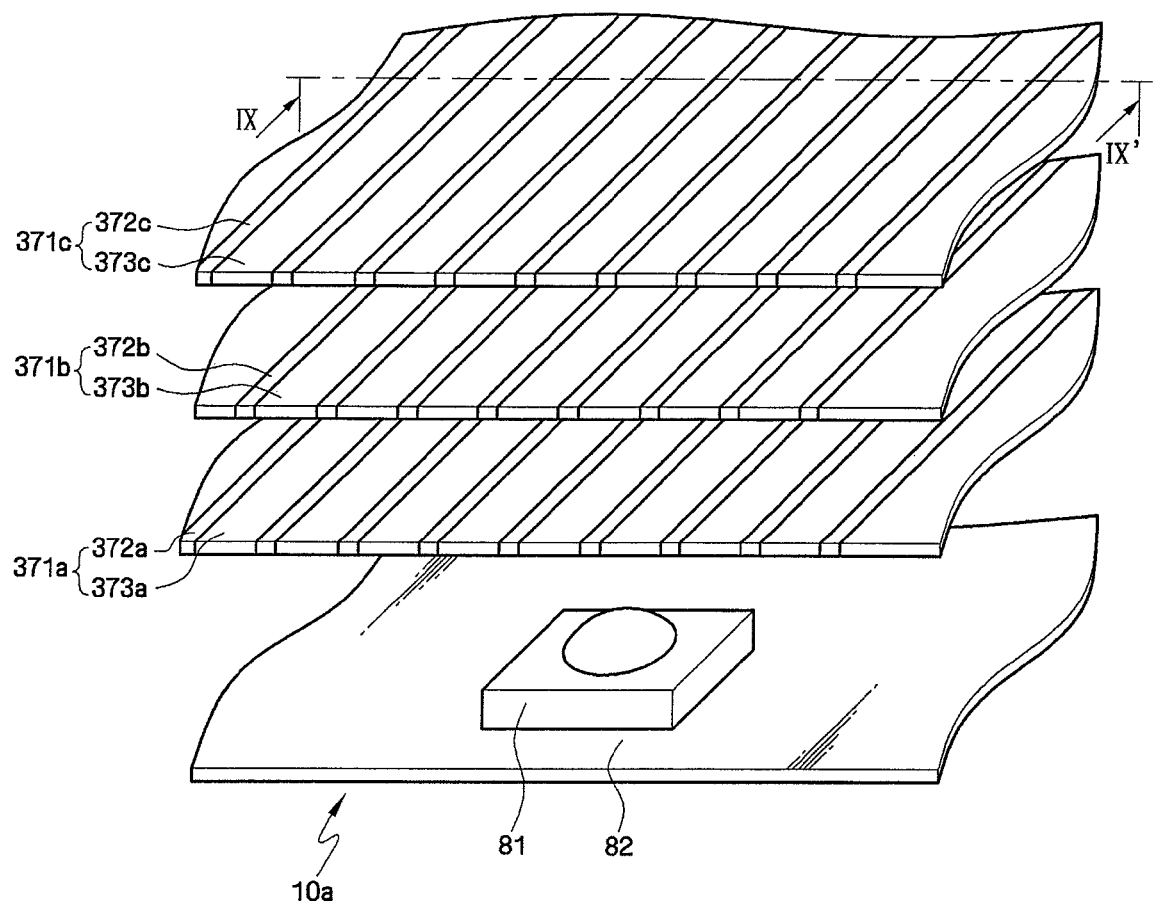
FIG. 8 illustrates an enlarged perspective view of a light source assembly according to an embodiment of the present invention.

A light source assembly according to another embodiment of the present invention will hereinafter be described in detail with reference to FIGS. 8 and 9. FIG. 8 illustrates a partial exploded view of a light source assembly 10a according to another embodiment of the present invention, and FIG. 9 illustrates a cross-sectional view taken along line IX-IX' of FIG. 8.

Figure 9:
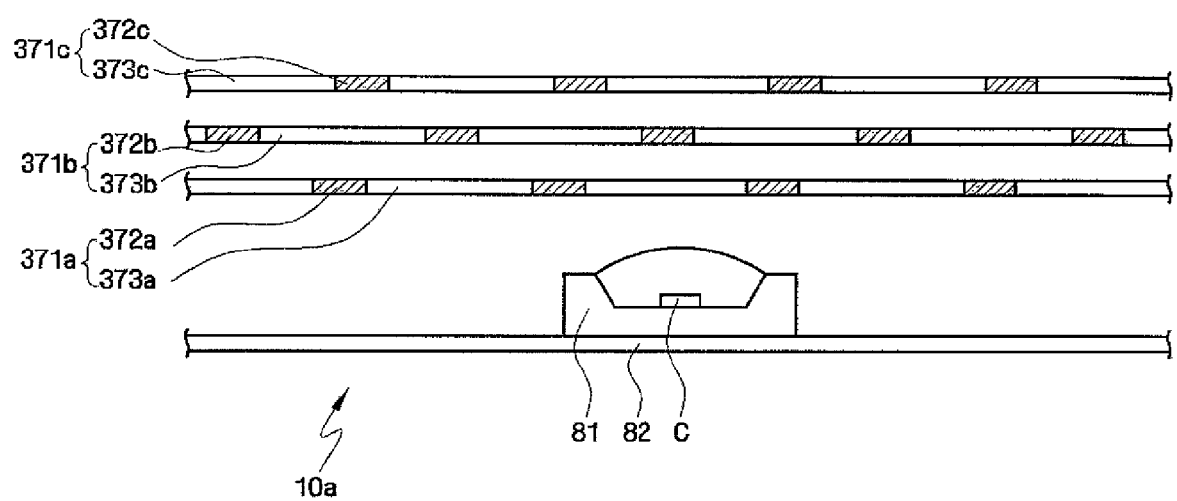
FIG. 9 illustrates a cross-sectional view taken along line IX-IX' of FIG. 8.

Referring to FIGS. 8 and 9, the light source assembly 10a includes a light source unit 81, a circuit board 82, a first wavelength conversion sheet 371a, a second wavelength conversion sheet 371b, and a third wavelength conversion sheet 371c.

The light source unit 81 generates light. Then, the light generated by the light source unit 81 sequentially transmits through the first, second and third wavelength conversion sheets 371a, 371b, and 371c. As a result, white light is emitted from the light source assembly 10a.

The light source unit 81 may generate light having a wavelength shorter than that of blue light, for example, UV light.

The first wavelength conversion sheet 371a is disposed above the light source unit 81. The first wavelength conversion sheet 371a includes a plurality of first wavelength conversion patterns 372a, which convert the wavelength of light, and a plurality of first light-transmission patterns 373a, which transmit light therethrough without converting the wavelength of the light. The first wavelength conversion sheet 371a may be formed as a transparent sheet or plate that can transmit light therethrough. Each of the first wavelength conversion patterns 372a includes wavelength conversion particles that convert light incident thereupon into red light.

The second wavelength conversion sheet 371b is disposed above the first wavelength conversion sheet 371a. The second wavelength conversion sheet 371b includes a plurality of second wavelength conversion patterns 372b, which convert the wavelength of light, and a plurality of second light-transmission patterns 373b, which transmit light therethrough without converting the wavelength of the light. Each of the second wavelength conversion patterns 372b includes wavelength conversion particles that convert light incident thereupon into green light.

The third wavelength conversion sheet 371c is disposed above the second wavelength conversion sheet 371b. The third wavelength conversion sheet 371c includes a plurality of third wavelength conversion patterns 372c, which convert the wavelength of light, and a plurality of third light-transmission patterns 373c, which transmit light therethrough without converting the wavelength of the light. Each of the third wavelength conversion patterns includes wavelength conversion particles that convert light incident thereupon into blue light.

When at least one of the first, second and third wavelength conversion sheets 371a, 371b and 371c is moved laterally over the light source unit 81, the overlapping areas of the first wavelength conversion patterns 372a, the second wavelength conversion patterns 372b, and the third wavelength conversion patterns 372c vary accordingly. In this manner, it is possible to adjust the ratio of red light green light and blue light in light emitted from the light source assembly 10a and thus to adjust the color temperature of the light emitted from the light source assembly 10a.

Figure 10:
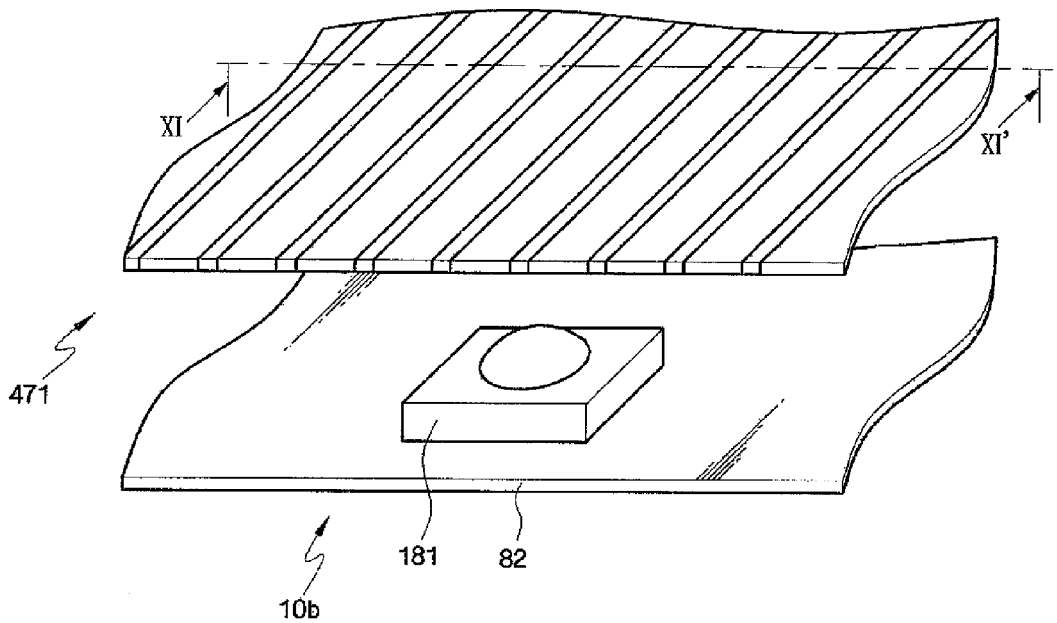
FIG. 10 illustrates an enlarged perspective view of a light source assembly according to an embodiment of the present invention.

A light source assembly according to another embodiment of the present invention will hereinafter be described in detail with reference to FIGS. 10 and 11. FIG. 10 illustrates a partial exploded view of a light source assembly 10b according to another embodiment of the present invention, and FIG. 11 illustrates a cross-sectional view taken along line XI-XI' of FIG. 10.

Figure 11:
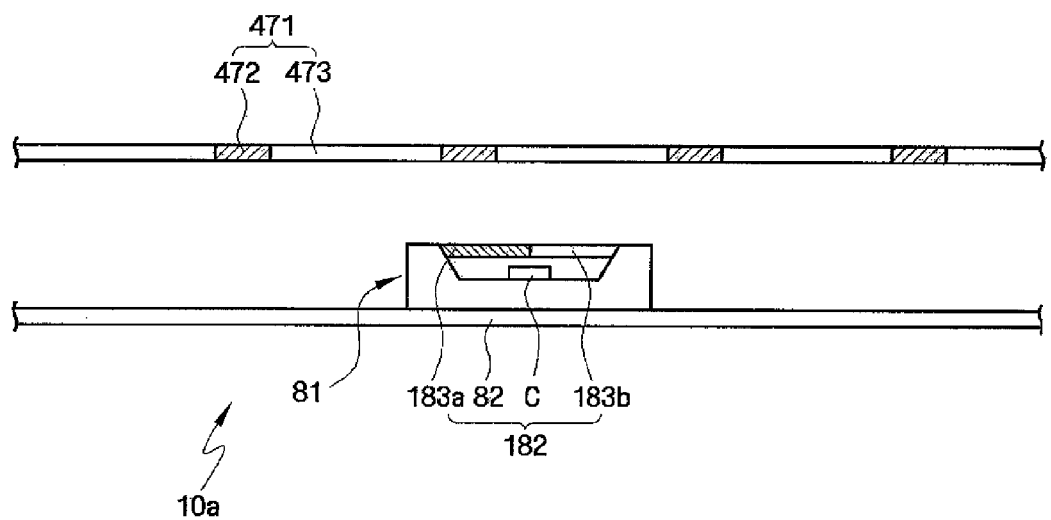
FIG. 11 illustrates a cross-sectional view taken along line XI-XI' of FIG. 10.

Referring to FIGS. 10 and 11, the light source assembly 10b includes a light source unit 81, a circuit board 82 and a wavelength conversion sheet 471.

The light source unit 81 includes a light-emitting chip C and a wavelength conversion layer 182. The light-emitting chip C generates blue light or light having a wavelength shorter than that of blue light. The wavelength conversion layer 182 includes a wavelength conversion region 183a, which converts blue light into green or red light, and a light-transmission region 183b, which transmits blue light therethrough as blue light. The wavelength conversion layer 182 is formed in an opening of the light source unit 81. The wavelength conversion region 183a of the wavelength conversion layer 182 converts the wavelength of light generated by the light-emitting chip C, and the light-transmission region 183b of the wavelength conversion layer 182 transmits the light generated by the light-emitting chip C without converting the wavelength of the light generated by the light-emitting chip C.

Light transmitted through the wavelength conversion layer 182 is incident upon the wavelength conversion sheet 471. The wavelength conversion sheet 471 includes a plurality of wavelength conversion patterns 472 and a plurality of light-transmission patterns 473. Thus, the light incident upon the wavelength conversion sheet 471 transmits through the wavelength conversion patterns 472 or the light-transmission patterns 473.

Either the wavelength conversion sheet 471 or the light source unit 81 may be moved laterally. That is, the wavelength conversion sheet 471 may be moved laterally over the light source unit 81. Alternatively, the light source unit 81 may be moved laterally. In this manner, it is possible to adjust the overlapping areas of the wavelength conversion region 183a and the wavelength conversion patterns 472 and thus to adjust the color temperature of light emitted from the light source assembly 10b.

Figure 12:
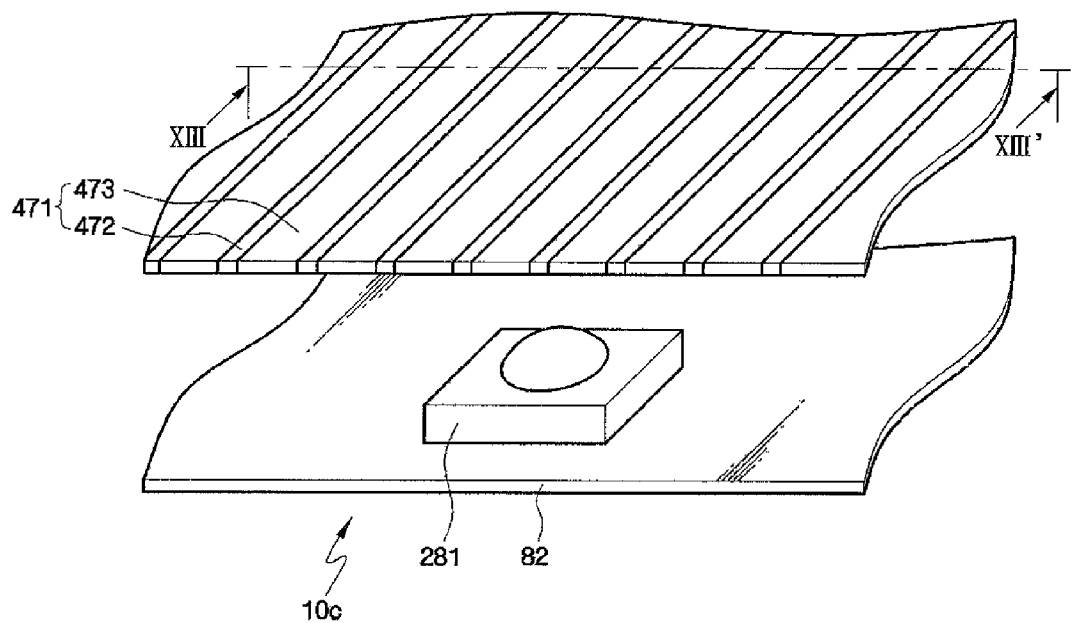
FIG. 12 illustrates an enlarged perspective view of a light source assembly according to an embodiment of the present invention.

A light source assembly according to another embodiment of the present invention will hereinafter be described in detail with reference to FIGS. 12 and 13. FIG. 12 illustrates a partial exploded view of a light source assembly 10c according to another embodiment of the present invention, and FIG. 13 illustrates a cross-sectional view taken along line XIII-XIII' of FIG. 12.

Figure 13:
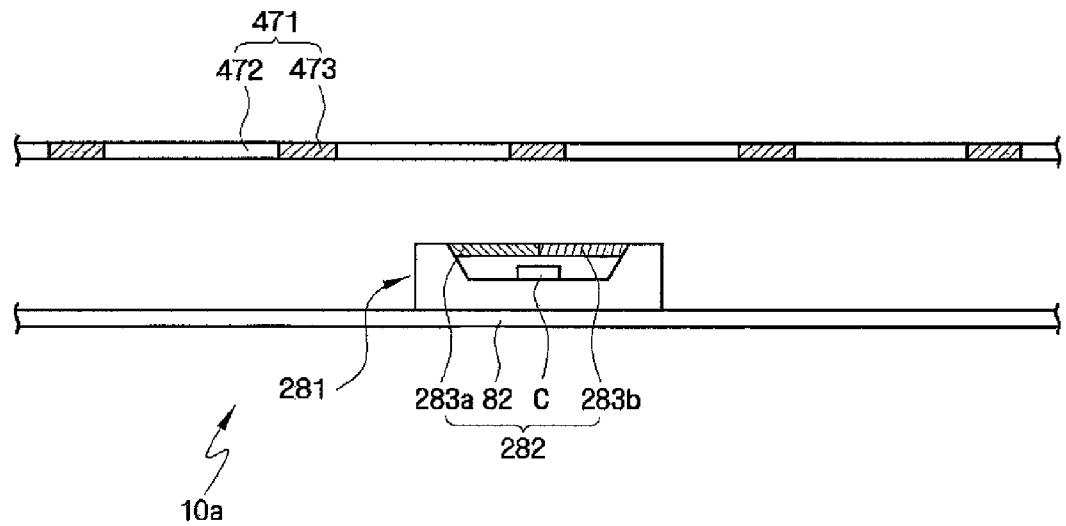
FIG. 13 illustrates a cross-sectional view taken along line XIII-XIII' of FIG. 12.

Referring to FIGS. 12 and 13, the light source assembly 10c includes a light source unit 81, a circuit board 82 and a wavelength conversion sheet 471. The wavelength conversion sheet 471 includes a plurality of light-transmission patterns 472 and a plurality of wavelength conversion patterns 473.

The light source unit 81 includes a light-emitting chip C and a wavelength conversion layer 282. The light-emitting chip C generates light having a wavelength shorter than that of blue light, for example, UV light. The wavelength conversion layer 282 is formed in an opening of the light source unit 81. The wavelength conversion layer 282 includes a first wavelength conversion region 283a, which converts light incident thereupon into blue light, and a second wavelength conversion region 283b, which converts light incident thereupon into green light. Due to the first and second wavelength conversion regions 283a and 283b, the light source unit 81 can emit light of two different colors. More specifically, light generated by the light source unit 81 may be converted into light of two different colors after transmitting through the wavelength conversion layer 282. Thereafter, the light of two different colors is mixed with light transmitted through the light-transmission patterns 473 of the wavelength conversion sheet 471, thereby generating white light.

The first wavelength region 283a, the second wavelength conversion region 283b and the wavelength conversion patterns 472 may convert light incident thereupon into red, green or blue light.

An LCD according to an embodiment of the present invention will hereinafter be described in detail with reference to FIG. 14. FIG. 14 illustrates an exploded perspective view of an LCD 1 according to an embodiment of the present invention.

Referring to FIG. 14, the LCD 1 includes a liquid crystal panel assembly 30, an upper container 20, and a backlight assembly 5.

The liquid crystal panel assembly 30 includes a liquid crystal panel 31, a plurality of gate tape carrier packages (TCPs) 35, a plurality of data TCPs 34 and an integrated printed circuit board (PCB) 36. The liquid crystal panel 31 includes a thin-film transistor (TFT) display panel 32, a common electrode display panel 33, and a liquid crystal layer (not shown) which is interposed between the TFT display panel 32 and the common electrode display panel 33.

The TFT display panel 32 includes a plurality of gate lines (not shown), a plurality of data lines (not shown), a TFT array (not shown), and a plurality of pixel electrodes (not shown). The common electrode display panel 33 includes black matrices (not shown) and a plurality of common electrodes (not shown), and faces the TFT display panel 32. The liquid crystal panel 31 displays images.

The gate TCPs 35 are respectively connected to the gate lines, and the data TCPs 34 are respectively connected to the data lines. The gate TCPs 35 and the data TCPs 36 include a tape automated bonding (TAB) tape, which can connect a semiconductor chip to an interconnection pattern on a base film through TAB.

Various driving elements for applying a gate driving signal to the gate TCPs 35 or for applying a data driving signal to the data TCPs 34 are mounted on the integrated PCB 36.

The upper container 20 forms the exterior of the LCD 1. The upper container 20 has an empty space therein and can thus contain the liquid crystal panel assembly 30 therein. An upper container 20 has an open window in the middle, and thus, the liquid crystal panel assembly 30 can be exposed through the open window of the upper container 20.

The upper container 20 and a lower container 90 may be disposed on opposite sides of a middle frame 40, and may be coupled to each other.

The backlight assembly 5 includes the middle frame 40, a plurality of optical sheets 50, a diffusive plate 60, a light source assembly 10 and the lower container 90.

The middle frame 40 contains the optical sheets 50, the diffusive plate 60 and the light source assembly 10 therein, and may be settled and fixed in the lower container 90. The middle frame 40 includes a plurality of sidewalls that form the outline of a rectangle. The middle frame 40 has an open window in the middle, and thus, light transmitted through the diffusive plate 60 and the optical sheets 50 can also transmit through the middle frame 40.

The optical sheets 50 diffuse and collect light transmitted through the diffusive plate 60. The optical sheets 50 are disposed above the diffusive plate 60, and may be contained in the middle frame 40. The optical sheets 50 may include a first prism sheet, a second prism sheet and a protective sheet.

The first and second prism sheets improve the luminance of the LCD 1 within the range of valid viewing angles by refracting light transmitted through the diffusive plate 60 and thus concentrating light incident thereupon at low incidence angles on the front of the LCD 1.

The protective sheet, which is disposed on the first and second prism sheets, protects the first and second prism sheets. In addition, the protective sheet diffuses light and thus provides a uniform distribution of light. However, the structure of the optical sheets 50 is not restricted to that set forth herein. That is, the structure of the optical sheets 50 may vary according to the specification of the LCD 1.

The diffusive plate 60 diffuses light emitted from a plurality of light source units 81 in various directions and thus prevents bright spots, which are generated along the edges of the light source units 81, from being visible from the front of the LCD 1.

The light source assembly 10 generates light and provides the light to the diffusive plate 60. The light source assembly 10 includes the light source units 81, a circuit board 82, a first wavelength conversion sheet 71a, a second wavelength conversion sheet 71b and a sheet moving unit 70. The light source units 81 are mounted on the circuit board 82. The light source units 81 receive a driving voltage and emit blue light or UV light in response to the driving voltage. The light emitted by the light source units 81 sequentially transmits through the first and second wavelength conversion sheets 71a and 71b, thereby generating white light. The white light is provided to the diffusive plate 60. The sheet moving unit 70 adjusts the color temperature of light provided to the liquid crystal panel 31 by adjusting the overlapping areas of a plurality of wavelength conversion patterns of the first wavelength conversion sheet 71a and a plurality of wavelength conversion patterns of the second wavelength conversion sheet 71b. The structure and the operation of the light source assembly 10 has already been described above with reference to FIGS. 1 through 13, and thus, detailed descriptions thereof will be omitted.

The circuit board 82 may be coated with a reflective material that reflects light emitted from the light source units 81.

The LCD 1 may be a direct-type LCD in which a plurality of light source units are disposed directly below a liquid crystal panel, but the embodiments of the present invention are not restricted to this. That is, the LCD 1 may be an edge-type LCD in which a light source assembly is disposed on one side of a waveguide plate and thus light is provided to a liquid crystal panel through the waveguide plate.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light source assembly comprising:
    a light-emitting chip which generates light; and
    a plurality of wavelength conversion members comprising wavelength conversion particles that convert the light into light having a predetermined wavelength, the predetermined wavelength being determined according to the size of the wavelength conversion particles, wherein the wavelength conversion members further comprise a plurality of wavelength conversion patterns including the wavelength conversion particles, and wherein the wavelength conversion patterns are formed in a plurality of continuous and straight rows extending from one end to an opposite end of a wavelength conversion sheet, wherein the wavelength conversion patterns form a lattice including the plurality of continuous and straight rows and further including a plurality of continuous columns, wherein the plurality of continuous and straight rows are maintained in an overlapped status in a row direction.

2. The light source assembly of claim 1, wherein:
    the light source assembly adjusts a color of the light by adjusting overlapping areas of the plurality of wavelength conversion patterns.

3. The light source assembly of claim 2, wherein the light-emitting chip emits blue light and the wavelength conversion members comprise a green wavelength conversion member which converts the light into green light and a red wavelength conversion member which converts the light into red light.

4. The light source assembly of claim 2, wherein the light-emitting chip emits light having a wavelength shorter than that of blue light and the wavelength conversion members comprise a blue wavelength conversion member which converts the light into blue light and a red wavelength conversion member which converts the light into red light.

5. The light source assembly of claim 2, further comprising a circuit board on which the light-emitting chip is mounted, wherein at least one of the wavelength conversion members is moved in a direction parallel to the circuit board.

6. The light source assembly of claim 2, further comprising a moving unit which adjusts the overlapping areas of the plurality of wavelength conversion patterns.

7. The light source assembly of claim 6, wherein the moving unit either moves the wavelength conversion members in a direction parallel to the light-emitting chip or moves the light-emitting chip in a direction parallel to the wavelength conversion members.

8. The light source assembly of claim 6, wherein the moving unit comprises a moving roller disposed on at least one side of the moving unit, and as the moving roller rotates, the wavelength conversion members move accordingly.

9. The light source assembly of claim 2, wherein the wavelength conversion patterns further comprise circular or rectangular dots.

10. The light source assembly of claim 1, further comprising a circuit board on which the light-emitting chip is mounted, wherein the circuit board is moved in a direction parallel to the wavelength conversion members.

11. The light source assembly of claim 1, wherein the wavelength conversion patterns are formed as stripes.

12. The light source assembly of claim 1, wherein the wavelength conversion particles comprise CdSe/ZnS.

13. The light source assembly of claim 12, wherein the wavelength conversion particles comprise an inner core of CdSe and an outer shell of ZnS.

14. A light source assembly comprising:
a light source unit comprising a light-emitting chip that generates light and a wavelength conversion layer that is disposed on the light-emitting chip and that changes the color of the light generated from the light-emitting chip; and
a wavelength conversion member comprising a plurality of wavelength conversion patterns comprising wavelength conversion particles that convert light generated by the light source unit into light having a predetermined wavelength, wherein the light source assembly adjusts the color of light by adjusting overlapping areas of the wavelength conversion layer and the wavelength conversion patterns, wherein the wavelength conversion patterns are formed in a plurality of continuous and straight rows extending from one end to an opposite end of a wavelength conversion sheet, wherein the wavelength conversion patterns form a lattice including the plurality of continuous and straight rows and further including a plurality of continuous columns, wherein the plurality of continuous and straight rows are maintained in an overlapped status in a row direction.

15. The light source assembly of claim 14, wherein the light source unit further comprises a groove having an opening on the top of the groove, wherein the light-emitting chip is located in the groove, and the wavelength conversion layer occupies at least a portion of the opening, and is spaced apart from the light emitting chip.

16. The light source assembly of claim 14, wherein the wavelength conversion layer is divided into one or more regions that emit light of different colors, wherein the one or more regions are positioned side by side in the same layer.

17. The light source assembly of claim 14, wherein the wavelength conversion layer comprises wavelength conversion particles that change a wavelength of the light generated by the light-emitting chip.

18. The light source assembly of claim 14, wherein the predetermined wavelength is determined according to the size of the wavelength conversion particles.

19. A liquid crystal display (LCD) comprising:
a liquid crystal panel; and
a light source assembly which provides light to the liquid crystal panel and comprises a light-emitting chip that generates light and a plurality of wavelength conversion members, each of the plurality of wavelength conversion members comprising a plurality of wavelength conversion patterns,
the wavelength conversion patterns comprising wavelength conversion particles converting the light generated by the light-emitting chip into light having a predetermined wavelength,
wherein the wavelength conversion members are aligned to overlap each other and the light source assembly adjusts the color of light by adjusting overlapping areas of the wavelength conversion patterns of each of the wavelength conversion members, wherein the wavelength conversion patterns are formed in a plurality of continuous and straight rows extending from one end to an opposite end of a wavelength conversion sheet, wherein the wavelength conversion patterns form a lattice including the plurality of continuous and straight rows and further including a plurality of continuous columns, wherein the plurality of continuous and straight rows are maintained in an overlapped status in a row direction.

20. The LCD of claim 19, further comprising a waveguide plate disposed below the liquid crystal panel, wherein the light source assembly is disposed on a side of the waveguide plate.

21. The LCD of claim 19, wherein the light source assembly further comprises a moving unit which moves at least one of the wavelength conversion members in a direction parallel to the wavelength conversion members.

22. A wavelength conversion member comprising wavelength conversion particles which convert light incident thereupon into light having a predetermined wavelength, the predetermined wavelength being determined according to the size of the wavelength conversion particles, wherein the wavelength conversion member further comprises a plurality of wavelength conversion patterns including the wavelength conversion particles, and wherein the wavelength conversion patterns are formed in a plurality of continuous and straight rows extending from one end to an opposite end of a wavelength conversion sheet, wherein the wavelength conversion patterns form a lattice including the plurality of continuous and straight rows and further including a plurality of continuous columns, wherein the plurality of continuous and straight rows are maintained in an overlapped status in a row direction.

23. The wavelength conversion member of claim 22, wherein the wavelength conversion patterns comprise a plurality of first wavelength conversion patterns including the wavelength conversion particles, wherein the wavelength conversion member is aligned to overlap another wavelength conversion member comprising a plurality of second wavelength conversion patterns and wherein the color of light incident on each of the wavelength conversion members is adjusted by adjusting overlapping areas of the first wavelength conversion patterns and the second wavelength conversion patterns.

* * * * *